(12) United States Patent
Liang

(10) Patent No.: US 9,969,126 B2
(45) Date of Patent: May 15, 2018

(54) ASSEMBLY STICKING DEVICES

(71) Applicant: Wuhan China Star Optoelectronics Technology Co., Ltd., Wuhan, Hubei (CN)

(72) Inventor: Chao Liang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 108 days.

(21) Appl. No.: 14/914,135

(22) PCT Filed: Jan. 26, 2016

(86) PCT No.: PCT/CN2016/072108
§ 371 (c)(1),
(2) Date: Feb. 24, 2016

(87) PCT Pub. No.: WO2017/075916
PCT Pub. Date: May 11, 2017

(65) Prior Publication Data
US 2017/0259495 A1    Sep. 14, 2017

(30) Foreign Application Priority Data
Nov. 4, 2015   (CN) .......................... 2015 1 0743108

(51) Int. Cl.
*B23P 19/02* (2006.01)
*B23P 19/00* (2006.01)
(Continued)

(52) U.S. Cl.
CPC .............. *B29C 65/80* (2013.01); *B23P 19/00* (2013.01); *B29C 65/48* (2013.01);
(Continued)

(58) Field of Classification Search
CPC ......... B29C 65/48; B29C 65/80; B23P 19/00; B29L 2011/00; B32B 37/10; B32B 37/06
(Continued)

(56) References Cited

FOREIGN PATENT DOCUMENTS

CN    101806971 A    8/2010
CN    102289023 A    12/2011
(Continued)

OTHER PUBLICATIONS

English translation of CN204280574.*
(Continued)

*Primary Examiner* — Sonya Mazumdar
(74) *Attorney, Agent, or Firm* — Andrew C. Cheng

(57) ABSTRACT

An assembly sticking device includes an absorbing device for absorbing a plurality of optical sheets, and a transmission device arranged below the absorbing device for horizontally transporting the curved backlight module to be assembled with the optical sheets. When the transmission device horizontally transmits one of the curved backlight modules to be right below the absorbing device, the absorbing device configures one optical sheet to face toward the curved backlight module, the absorbing device moves close to the transmission device, and releases the optical sheets such that the released optical sheets is assembled with the curved backlight module.

12 Claims, 2 Drawing Sheets

(51) Int. Cl.
  *B32B 37/00* (2006.01)
  *B32B 37/10* (2006.01)
  *B29C 65/80* (2006.01)
  *B29C 65/48* (2006.01)
  *B29L 11/00* (2006.01)
  *B32B 37/06* (2006.01)

(52) U.S. Cl.
  CPC .......... *B29L 2011/00* (2013.01); *B32B 37/06* (2013.01); *B32B 37/10* (2013.01)

(58) Field of Classification Search
  USPC ........................................ 156/554, 574, 576
  See application file for complete search history.

(56) References Cited

FOREIGN PATENT DOCUMENTS

| | | |
|---|---|---|
| CN | 202608200 U | 12/2012 |
| CN | 103149727 A | 6/2013 |
| CN | 104385757 A | 3/2015 |
| CN | 204280574 U | 4/2015 |
| CN | 204641013 U | 9/2015 |
| CN | 205290278 U | 6/2016 |
| JP | 2012024892 A | 2/2012 |

OTHER PUBLICATIONS

English translation of International search report for WO2017075916.*
English translation of Written Opinion for WO2017075916.*

\* cited by examiner

ASSEMBLY STICKING DEVICES

BACKGROUND OF THE INVENTION

1. Field of the Invention

The present disclosure relates to automation device technology, and more particularly to an assembly sticking device for assembling sheet-shaped components.

2. Discussion of the Related Art

In the conventional planar backlight unit, the assembly process of the optical sheet generally adopts optical sheets that are flatly cut and the plane of the optical sheet is absorbed. Generally, the optical sheets may include diffusion sheets, graced film, reflective film, etc., which are transported in roll mode.

If the curved backlight module is assembled by the conventional process of planar backlight module, the stress may exist in the optical sheets when the optical sheet is bent. In addition, an inner and outer surfaces of the optical sheet may be uneven for the reason that the inner surface is compressed and the outer surface is extended. Even, the connecting adhesive may fall off or the optical sheet may be curved. As such, the optical performance of the optical sheet may be affected, and the strength of the connecting structure of the curved backlight module may be weaker.

SUMMARY

In one aspect, an assembly sticking device for assembling optical sheets with a curved backlight module includes: an absorbing device for absorbing a plurality of optical sheets; a transmission device arranged below the absorbing device for horizontally transporting the curved backlight module to be assembled with the optical sheets; and wherein when the transmission device horizontally transmits one of the curved backlight modules to be right below the absorbing device, the absorbing device configures one optical sheet to face toward the curved backlight module, the absorbing device moves close to the transmission device, and releases the optical sheets such that the released optical sheets is assembled with the curved backlight module.

Wherein the absorbing device is configured to perform automatic rotation, wherein when the transmitting device horizontally transports one of the curved backlight module to be right below the absorbing device, the absorbing device performs the automatic rotation to configure one of the optical sheets to face toward one curved backlight module.

Wherein the absorbing device is capable of rotating upward and downward, wherein when the absorbing device rotates downward, the absorbing device moves close to the transmission device.

Wherein when one of the optical sheets is assembled with one curved backlight module, the absorbing device rotates upward so as to move away from the transmitting device, the curved backlight module horizontally transports the next curved backlight module, and the absorbing device performs the automatic rotation; when the next curved backlight module is transmitted to be right below the absorbing device, the next optical sheet absorbed by the absorbing device faces toward the next curved backlight module, the absorbing device rotates downward and releases the next optical sheet such that the next optical sheet is assembled with the next curved backlight module.

Wherein the transmission device further includes: a transmission platform configured to move along a horizontal direction, and the transmission platform includes a plurality of curved slots; and a plurality of curved position tooling, wherein each of the curved position tooling corresponds to one of the curved slots, and each of the curved position tooling is configured for carrying and positioning one curved backlight module.

Wherein the absorbing device includes a scroll, at least one absorbing slot within the scroll, and a driving component, wherein the absorbing slot extends toward a surface of the scroll to absorb the optical sheet on the surface of the scroll, and the driving component is configured for driving the scroll to perform the automatic rotation or to rotate upward or downward.

Wherein the absorbing device includes a plurality of absorbing slots, and the eight absorbing slots are arranged along a cross-section of the scroll with the same radian, and each of the absorbing slots absorbs one optical sheet.

Wherein the absorbing slots communicate with each other, wherein when one of the curved backlight module is transported horizontally to be right below the scroll by the transmission platform, one optical sheet absorbed by one of the absorbing slot faces toward one curved backlight module, the driving component drives the scroll to rotate downward, one of the absorbing slot releases the absorbed optical sheet such that the released optical sheet is assembled with one of the curved backlight module.

Wherein the absorbing slots are independent, and when one of the curved backlight module is transported horizontally to be right below the scroll by the transmission platform, one optical sheet absorbed by one of the absorbing slot faces toward one curved backlight module, the driving component drives the scroll to rotate downward, one of the absorbing slot releases the absorbed optical sheet such that the released optical sheet is assembled with one of the curved backlight module.

Wherein the driving component includes a rotation motor and an upward/downward rotation driving unit, wherein the rotation motor is configured to drive the scroll to perform the automatic rotation, and the upward/downward rotation driving unit is configured to drive the scroll to move upward or downward.

In view of the above, the assembly sticking device may assemble the optical sheets, such as optical films, optical adhesive tapes, and reflective sheets, and the stress directions of the optical sheets may be maintained at the same time. In this way, the curvity of the optical sheets may match that of the curved backlight module so as to avoid the uneven, fall off, or warped issues of the optical sheets.

DETAILED DESCRIPTION OF THE EMBODIMENTS

Figure 1:
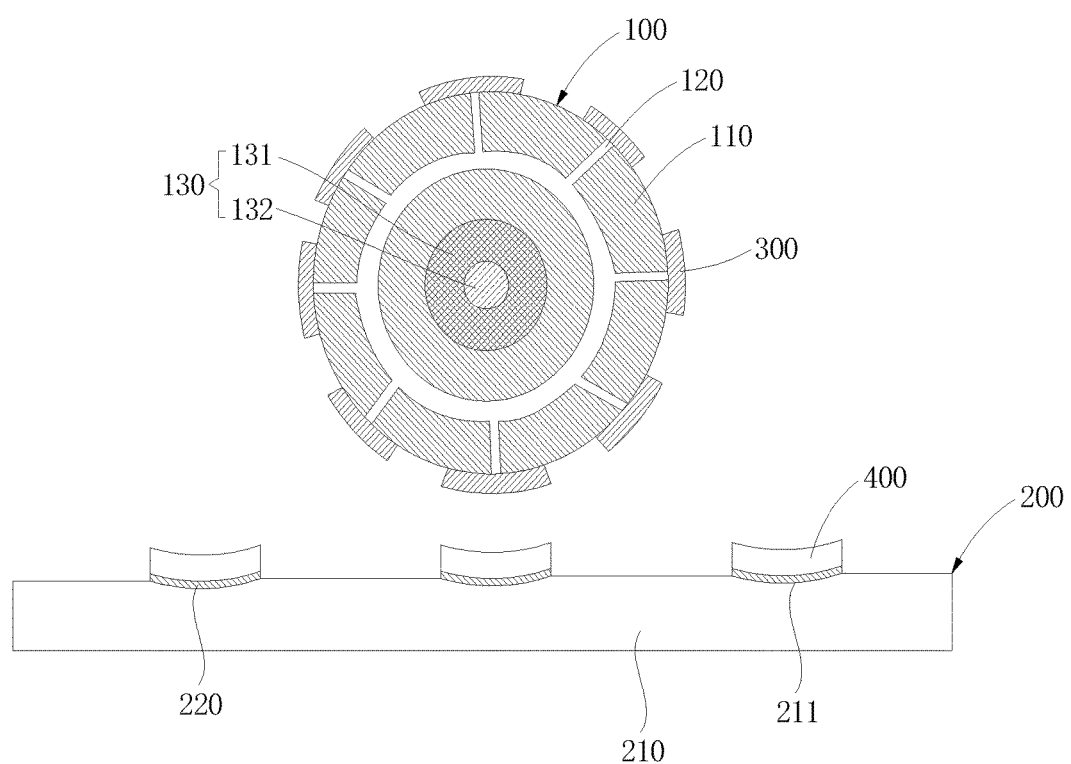
FIG. 1 is a schematic view of the assembly sticking device in accordance with one embodiment.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

FIG. 1 is a schematic view of the assembly sticking device in accordance with one embodiment. In an example, the assembly sticking device assemblies the optical sheet into the curved backlight module, but the present disclosure is not limited thereto.

The assembly sticking device of FIG. 1 includes an absorbing device 100 and a transmission device 200.

The absorbing device 100 is configured for absorbing a plurality of optical sheets 300. The transmission device 200 is arranged below the absorbing device 100, or the transmission device 200 is arranged to be opposite to the absorbing device 100. The transmission device 200 is configured for horizontally transporting the curved backlight module 400 to be attached with the optical sheets. That is, the transmission device 200 transmits each of the curved backlight module 400 to be right below the absorbing device 100 such that each of the curved backlight module 400 faces toward one optical sheet 300.

When the transmission device 200 transmits the curved backlight module 400 to be right below the absorbing device 100, the absorbing device 100 configures one optical sheet 300 to face toward the curved backlight module 400. The absorbing device 100 moves close to the transmission device 200, and releases the optical sheets 300 such that the released optical sheets 300 is assembled with the curved backlight module 400. In this way, one optical sheet 300 is assembled with the curved backlight module 400.

Afterward, the absorbing device 100 moves away from the transmission device 200. The transmission device 200 horizontally moves the next curved backlight module 400. When the next curved backlight module 400 is transmitted to be right below the absorbing device 100, the next optical sheet 300 absorbed by the absorbing device 100 faces toward the next curved backlight module 400. The absorbing device 100 moves close to the transmission device 200, and releases the next optical sheet 300 such that the next optical sheet 300 is assembled with the next curved backlight module 400. Similarly, each of the optical sheets 300 absorbed by the absorbing device 100 may be assembled with the corresponding curved backlight module 400.

Further, the absorbing device 100 may rotate automatically. As such, when the transmission device 200 transmits one curved backlight module 400 to be right below the absorbing device 100, one of the optical sheets 300 absorbed by the absorbing device 100 is configured to face toward one curved backlight module 400 via the automatic rotation. In this way, by the automatic rotation of the absorbing device 100, each of the optical sheets 300 may be assembled with corresponding curved backlight module 400.

In order to move the absorbing device 100 close to or away from the transmission device 200, in the embodiment, the absorbing device 100 may rotate upward or downward. When the absorbing device 100 rotates downward, the absorbing device 100 moves close to the transmission device 200. When the absorbing device 100 rotates upward, the absorbing device 100 moves away from the transmission device 200.

Specifically, the transmission device 200 includes a transmission platform 210 and a plurality of curved position tooling 220.

The transmission platform 210 moves along a horizontal direction. In the embodiment, the transmission platform 210 moves along the horizontal direction via a motor (not shown). However, the present disclosure is not limited thereto. The surface of the transmission platform 210 includes a plurality of curved slots 211. The curvity of the curved slots 211 matches with the curvity of the curved position tooling 220. Each of the curved position tooling 220 corresponds to one curved slots 211. Each of the curved position tooling 220 is configure for carrying one curved backlight module 400.

The absorbing device 100 includes a scroll 110, at least one absorbing slot 120 within the scroll 110, and a driving component 130.

The scroll 110 is cylinder-shaped, and the cross sectional of the scroll 110 is circular. The absorbing slot 120 is configured to be within the scroll 110, and extends toward a surface of the scroll 110. The absorbing slot 120 is configured to absorb the optical sheets 300 to be on a surface of the scroll 110. The driving component 130 is configured for driving the scroll 110 to perform the automatic rotation or to rotate upward or downward.

Further, in the embodiment, the number of the absorbing slots 120 is eight, but the present disclosure is not limited thereto. The number of the absorbing slots 120 may be configured in accordance with real scenario. The eight absorbing slots 120 are arranged along a cross-section of the scroll 110 with the same radian, and each of the absorbing slots 120 absorbs one optical sheet 300.

In addition, the eight absorbing slots 120 may communicate with each other. In this way, when the optical sheets 300 are absorbed, eight optical sheets 300 are absorbed by the eight absorbing slots 120 at the same time via pumping a channel. When the transmission platform 210 transports one curved backlight module 400 horizontally to be right below the scroll 110, the scroll 110 performs the automatic rotation such that one of the optical sheets 300 absorbed by one of the absorbing slots 120 faces toward one curved backlight module 400. The driving component 130 drives the absorbing device 100 to rotate downward such that the absorbing device 100 moves close to the transmission platform 210. One of the eight absorbing slot 120 release one of the optical sheets 300 such that the released optical sheet 300 is assembled with one curved backlight module 400.

In addition, in the embodiment, the driving component 130 includes a rotation motor 131 and an upward/downward rotation driving unit 132, such as an air cylinder. The rotation motor 131 is configured to drive the scroll 110 to perform the automatic rotation, and the upward/downward rotation driving unit 132 is configured to drive the scroll 110 to move upward or downward.

Figure 2:
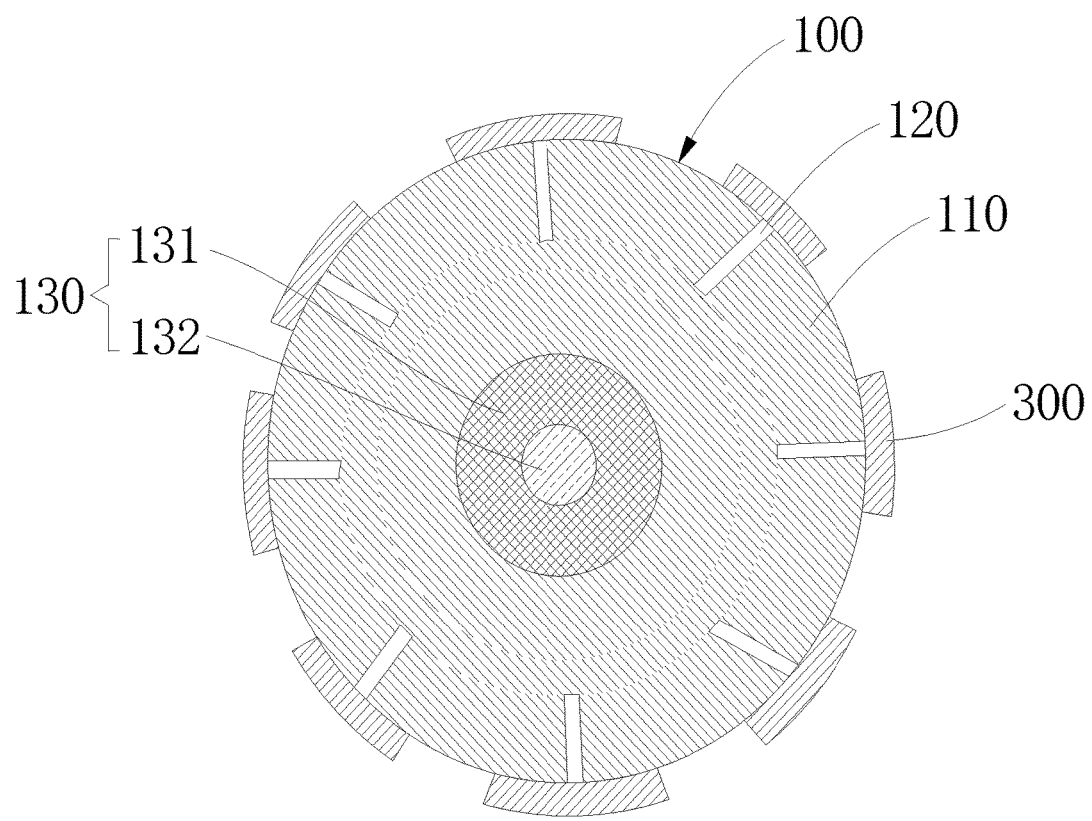
FIG. 2 is a schematic view of the absorbing device in accordance with another embodiment.

FIG. 2 is a schematic view of the absorbing device in accordance with another embodiment. The difference between the absorbing device in FIG. 2 and FIG. 1 resides in that: the eight absorbing slots 120 are independent.

When the optical sheets 300 are absorbed, the eight absorbing slot 120 are independently pumped so as to absorb one optical sheet 300 independently. When the transmission platform 210 transports one curved backlight module 400 to be right below the scroll 110, and the scroll 110 performs the automatic rotation such that one of the optical sheets 300 faces toward one curved backlight module 400. The driving component 130 drives the scroll 110 to move downward such that the scroll 110 moves close to the transmission platform 210. One of the optical sheets 300 absorbed by one of the absorbing slot 120 is released so as to be assembled with one curved backlight module 400.

In view of the above, the assembly sticking device may assemble the optical sheets, such as optical films, optical adhesive tapes, and reflective sheets, and the stress directions of the optical sheets may be maintained at the same time. In this way, the curvity of the optical sheets may match that of the curved backlight module so as to avoid the uneven, fall off, or warped issues of the optical sheets.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An assembly sticking device for assembling optical sheets with a curved backlight module, comprising:
   an absorbing device for absorbing a plurality of optical sheets;
   a transmission device arranged below the absorbing device for horizontally transporting the curved backlight module to be assembled with the optical sheets; and
   wherein when the transmission device horizontally transmits one of the curved backlight modules to be right below the absorbing device, the absorbing device configures one optical sheet to face toward the curved backlight module; and
   wherein the absorbing device is configured to perform automatic rotation, when the transmission device horizontally transports one of the curved backlight module to be tight below the absorbing device, the absorbing device performs the automatic rotation to configure one of the optical sheets to face toward one curved backlight module.

2. The assembly sticking device as claimed in claim 1, wherein the absorbing device is capable of rotating upward and downward, wherein when the absorbing device rotates downward, the absorbing device moves close to the transmission device.

3. The assembly sticking device as claimed in claim 2, wherein when one of the optical sheets is assembled with one curved backlight module, the absorbing device rotates upward so as to move away from the transmitting device, the curved backlight module horizontally transports the next curved backlight module, and the absorbing device performs the automatic rotation;
   when the next curved backlight module is transmitted to be right below the absorbing device, the next optical sheet absorbed by the absorbing device faces toward the next curved backlight module, the absorbing device rotates downward and releases the next optical sheet such that the next optical sheet is assembled with the next curved backlight module.

4. The assembly sticking device as claimed in claim 3, wherein the transmission device further comprises:
   a transmission platform configured to move along a horizontal direction, and the transmission platform comprises a plurality of curved slots; and
   a plurality of curved position tooling, wherein each of the curved position tooling corresponds to one of the curved slots, and each of the curved position tooling is configured for carrying and positioning one curved backlight module.

5. The assembly sticking device as claimed in claim 3, wherein the absorbing device comprises a scroll, at least one absorbing slot within the scroll, and a driving component, wherein the absorbing slot extends toward a surface of the scroll to absorb the optical sheet on the surface of the scroll, and the driving component is configured for driving the scroll to perform the automatic rotation or to rotate upward or downward.

6. The assembly sticking device as claimed in claim 5, wherein the absorbing device comprises a plurality of absorbing slots, and the eight absorbing slots are arranged along a cross-section of the scroll with the same radian, and each of the absorbing slots absorbs one optical sheet.

7. The assembly sticking device as claimed in claim 6, wherein the absorbing slots communicate with each other, wherein when one of the curved backlight module is transported horizontally to be right below the scroll by the transmission platform, one optical sheet absorbed by one of the absorbing slot faces toward one curved backlight module, the driving component drives the scroll to rotate downward, one of the absorbing slot releases the absorbed optical sheet such that the released optical sheet is assembled with one of the curved backlight module.

8. The assembly sticking device as claimed in claim 6, wherein the absorbing slots are independent, and when one of the curved backlight module is transported horizontally to be right below the scroll by the transmission platform, one optical sheet absorbed by one of the absorbing slot faces toward one curved backlight module, the driving component drives the scroll to rotate downward, one of the absorbing slot releases the absorbed optical sheet such that the released optical sheet is assembled with one of the curved backlight module.

9. The assembly sticking device as claimed in claim 5, wherein the driving component comprises a rotation motor and an upward/downward rotation driving unit, wherein the rotation motor is configured to drive the scroll to perform the automatic rotation, and the upward/downward rotation driving unit is configured to drive the scroll to move upward or downward.

10. The assembly sticking device as claimed in claim 6, wherein the driving component comprises a rotation motor and an upward/downward rotation driving unit, wherein the rotation motor is configured to drive the scroll to perform the automatic rotation, and the upward/downward rotation driving unit is configured to drive the scroll to move upward or downward.

11. The assembly sticking device as claimed in claim 7, wherein the driving component comprises a rotation motor and an upward/downward rotation driving unit, wherein the rotation motor is configured to drive the scroll to perform the automatic rotation, and the upward/downward rotation driving unit is configured to drive the scroll to move upward or downward.

12. The assembly sticking device as claimed in claim 8, wherein the driving component comprises a rotation motor and an upward/downward rotation driving unit, wherein the rotation motor is configured to drive the scroll to perform the automatic rotation, and the upward/downward rotation driving unit is configured to drive the scroll to move upward or downward.

* * * * *